United States Patent Office 3,337,055
Patented Aug. 22, 1967

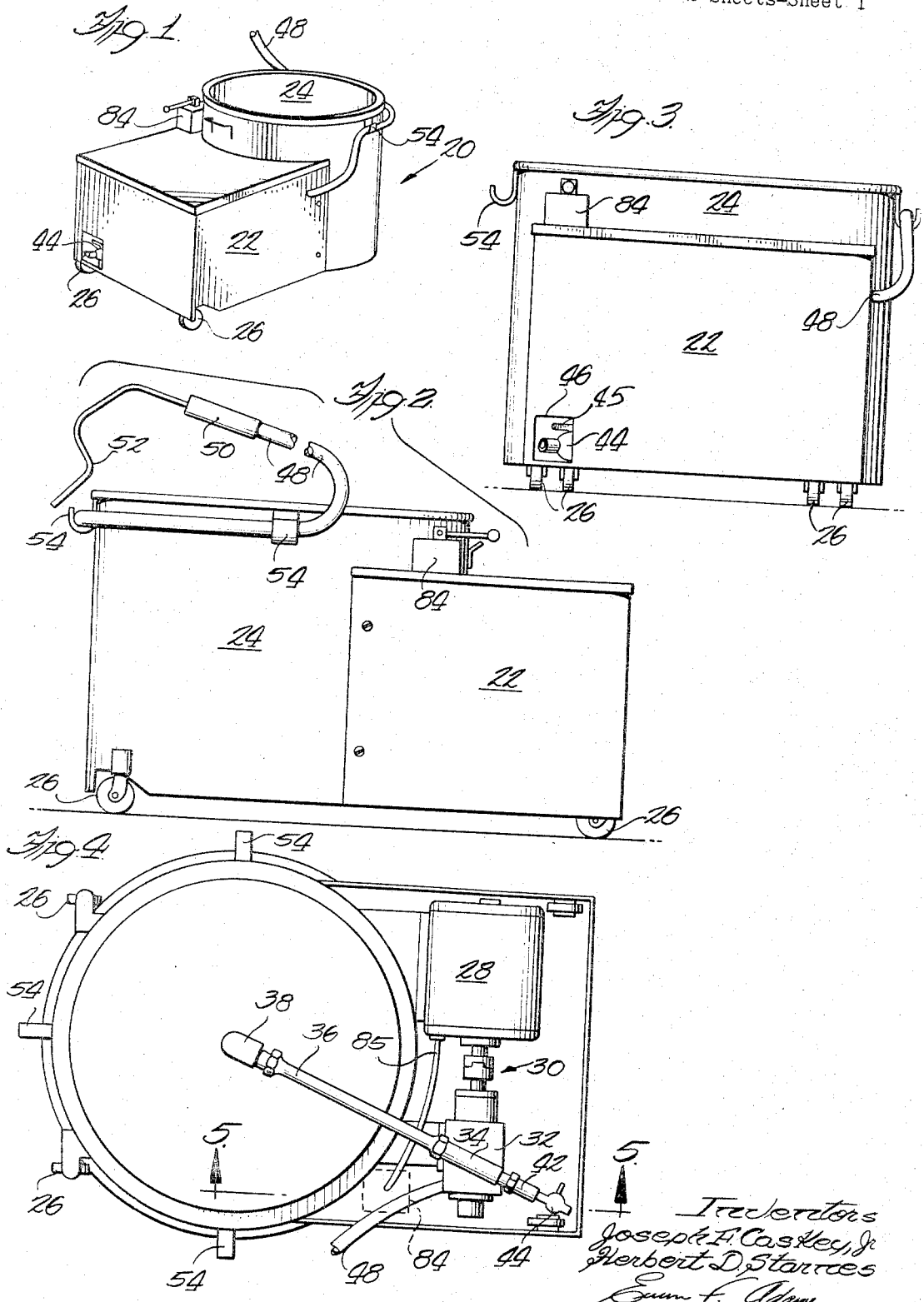

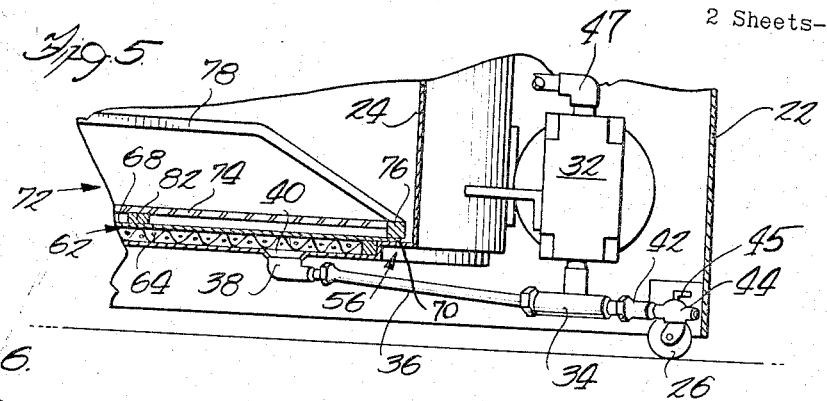

3,337,055
LIQUID VACUUM FILTER APPARATUS
Herbert Dailey Starnes and Joseph F. Caskey, Jr., Alliance, Ohio, assignors to Wacker-Dearborn Corp.
Filed July 25, 1966, Ser. No. 567,712
3 Claims. (Cl. 210—354)

This invention relates to a liquid vacuum filter apparatus and more particularly to an apparatus for withdrawing liquid from a container and returning the liquid to the container after filtering.

The present invention was developed in connection with vacuum filter devices for purifying liquid edible fat commonly used in fryers for preparing french fries, pastries or fat fried food products. It will become apparent, however, that the invention subsequently described will have application for numerous other filtering purposes. The prior art discloses filter units in which a vacuum pump is provided for creating a high vacuum below a filter element positioned in the bottom of the bowl which facilitates the passing of the fat through the filter element. Most of these devices provide means for mechanically fastening or securing the filter element in the bottom of the bowl.

Some prior art devices are adapted solely to allow fat from the fryer to drain into the filter device bowl but this is not acceptable for all types of fryers, such as electric fryers which commonly have no drain means. When such devices are adapted to fill the bowl from the fryer by a pump, a flexible hose is provided which may be inserted into the fryer fat to be drawn out. The pump is provided with a valve and a fill pipe which extends to near the top of the bowl and the fat which is drawn is pumped through this fill pipe into the bowl.

Several difficulties with these devices arise, however, one of which is the splattering of fat which is at a temperature of approximately 300° F. More important is the constant and perplexing field problem of the hardening or solidification of fat in the fill pipe and the valves included in the liquid transfer system, after the device has been used, which is extremely inaccessible. Finally, these devices are either more complex to operate or in construction because of the necessity of a selector valve for the pump; operational simplicity is exceedingly desirable since these devices are run by unskilled persons and, of course, construction is desirably simple to reduce manufacturing costs.

Accordingly, it is an object of this invention to provide a liquid vacuum filter apparatus having reversible pumping means for drawing liquid from a container into a filter bowl, having a filter element disposed in the bottom of the bowl and secured through the vacuum created beneath the filter element on which rests a retainer element, and which both fills and drains the bowl through an opening positioned in the bottom of the bowl.

It is another object of the present invention to provide an apparatus of the above-described type in which a small step is formed around the periphery of the bottom of the bowl for supporting the marginal edge of the filter element and a retainer element having an imperforate marginal edge for resting upon the filter element and step, and means for maintaining the filter element in proper relation to the step and retaining element.

It is a further object of the present invention to provide an apparatus having a container and a filter element disposed therein and which may be filled by means of withdrawing contaminated liquid from a receptacle and pumping such liquid into the bowl and subsequently filtering this liquid and returning it to the bowl without requiring any change in the flow passages of the apparatus by means of valves or the like.

It is still another object of the present invention to provide an apparatus of the above-described type which is simple in construction and operation and is safe to use for filtering high temperature liquid fat.

For a better understanding of the invention together with other further objects thereof, reference should now be made to the following detailed description which is to be read in conjunction with the accompanying drawing in which:

FIGURE 1 is a perspective view of a liquid vacuum filter apparatus constructed in accordance with the present invention;

FIGURE 2 is a side elevation view of the apparatus shown in FIGURE 1;

FIGURE 3 is an end elevation view of the apparatus shown in FIGURE 1;

FIGURE 4 is a bottom view of the apparatus shown in FIGURE 1;

FIGURE 5 is a partial sectional side elevation view taken along the line 5—5 of FIGURE 4;

FIGURE 6 is a diagrammatic sectional view of the apparatus bowl during the filling operation;

FIGURE 7 is an enlarged diagrammatic sectional view of the apparatus bowl shown in the position illustrated in FIGURE 6;

FIGURE 8 is a diagrammatic sectional view of the apparatus bowl during the filtering operation;

FIGURE 9 is an enlarged diagrammatic sectional view of the apparatus bowl shown in the position illustrated in FIGURE 8; and FIGURE 10 is a top plan view of the retainer element used in the apparatus bowl.

Referring now to FIGURES 1 through 3, there is shown one embodiment of a liquid vacuum filter apparatus 20 comprising a base 22, supporting a substantially cylindrical bowl 24. The unit is portable having base 22 mounted on caster 26.

As seen in FIGURE 4, base 22 supports a motor 28 operatively connected through coupling 30 or other suitable drive connection to a pump 32 of the standard well known manufacture. Mounted on the bottom of pump 32 is a T-fitting 34 in fluid communication with one port of pump 32. One end of T-fitting 34 is connected through a pipe 36 to an elbow 38 mounted on the bottom of bowl 24 and in fluid communication with the opening 40 in the bottom of the bowl. The opening 40 is preferably centrally located in the bottom of bowl 24 and a sump or slight depression may be formed surrounding this opening to facilitate the drainage of liquid into the opening 40. The other end of T-fitting 34 is connected through pipe 42 to a drain petcock 44 having a handle 45 accessible through a cut-out 46 in the end wall of base 22. It will be seen from FIGURE 5 that pipe 36 inclines downwardly from elbow 38 to T-fitting 34 to facilitate draining of all liquid from opening 40 to the drain petcock 44.

The other or upper port of pump 32 is connected through elbow 47 to a flexible hose 48 having a handle 50 and dip tube 52. Hose 48 is supported by hangers 54 attached to the outside of bowl 24 when the apparatus is not in use. The dip tube 52 is preferably made of metal and shaped so that it may be hung over the edge of a receptacle from which the fluid is drawn, such as a fat fryer.

As shown in FIGURE 5, the bottom of bowl 24 is formed with a peripheral step 56 having a horizontal wall 58 and a vertical cylindrical wall 60. A load bearing perforate element 62 comprising a circular open mesh screen 64 and a solid marginal portion 66 is positioned on the bottom of bowl 24. Load bearing element 62 has a height slightly less than or equal to the height of vertical cylindrical step surface 60, and has a diameter less than that of step vertical wall 60 so that it may rest on the bottom wall of bowl 24 and does not extend above the step 56. The screen 64 functions to support a flexible filter element 68 over substantially its entire area while maintaining a relatively unrestricted flow through the filter and from points beneath the filter displaced from opening 40 to the opening. While the screen 64 is seen to be in engagement with the bottom of bowl 24 and supported thereby, it will be appreciated that the bottom of bowl 24 may be formed concave to provide a space between the lower surface of the screen and the bottom of the bowl to increase the flow passage to opening 40. This would, of course, require that the screen 64 be of sufficient strength to accept the load expected during filtering as hereinafter explained. The filter element 68, may be made of paper or the like, and is positioned on screen 64 and rests thereon. Filter 68 has a diameter whereby the marginal edge 70 thereof overlies the horizontal surface 58 of step 56.

A retainer element 72 comprising a perforate circular portion 74 and an imperforate marginal portion 76 is positioned above filter element 68. It will be appreciated that the perforate circular portion 74 of retainer 72 may be eleminated but that where the apparatus is to be used with a fryer in which the liquid may be drained into bowl 24, the perforate portion 74 will protect the filter element 68 from rupture due to the force of the incoming fluid. The imperforate marginal portion 76 has a diameter whereby it overlies step 56 and the marginal edge 70 of filter element 68. The inner diameter of marginal portion 76 is less than or substantially the same as the diameter of step vertical cylindrical wall 60; the outer diameter of marginal portion 76 is greater than the diameter of wall 60 but must, of course, be less than the diameter of the cylindrical side wall of bowl 24. A handle 78 is mounted on retainer 72. As seen in FIGURE 10, the perforate circular portion of retainer 72 is preferably an expanded metal screen 80 to allow substantial unrestricted fluid flow. Means for maintaining the filter element flat comprising a bar 82 is mounted horizontally across retainer 72 for purposes to be hereinafter described.

An electrical selector switch 84 of common well-known manufacture is mounted on base 22 for operating the motor 28 in either direction and is connected thereto by electrical wires 85. The switch may be positioned so as to operate motor 28 in one direction to drive pump 32 to suck fluid through hose 48 and pump the fluid into bowl 24 during filling. In a second position of switch 84, the motor is operated in a reverse direction so as to reverse the action of pump 32 to create a vacuum below the filter element 68 and pump fluid from the bowl 24 during filtering.

In operation, the apparatus is prepared by positioning the load bearing perforate element 62, filter element 68 and retainer 72 in the bottom of the bowl 24. The apparatus 20 is conveniently positioned adjacent a receptacle, such as a fat fryer, containing contaminated liquid fat which is at an elevated temperature of approximately 300° F. The dip tube 52 is immersed in the liquid fat and the selector switch is positioned to withdraw the fluid from the container and force it into the bowl through pipe 36 and opening 40. As seen in FIGURE 6, the flow of fluid into bowl 24 forces the load bearing element 62, filter 68 and retainer 72 upward. While a small portion of the fat will flow through the annular opening between the wall of bowl 24 and the outer edge of the imperforate marginal portion 76 of retainer 72, the bowl will fill primarily below the floating elements 62, 68 and 72 as shown in FIGURE 7.

When all of the fluid is within the bowl 24, it is common practice in the art to pour a composition into the fluid to improve filtering. This composition may be simple fuller's earth, or some well-known commercial product which augments the filtering process.

When the filling operation is completed the motor is stopped and the dip tube 52 is directed into the fluid within the bowl 24 and the selector valve is positioned so that pump 32 begins to draw fluid from the bowl through outlet 40. The weight of retainer 72 and the fluid flow will cause the load bearing element 62, filter 68 and retainer 72 to the bottom of the bowl as shown in FIGURE 8. The imperforate marginal portion 76 of retainer 72 will seat upon the marginal edge 70 of filter 68 which overlies step 56. A vacuum will be created below filter element 68 and the force of the fluid above retainer 72 will cause a tight seal to be formed between retainer marginal portion 76, the marginal edge 70 of filter element 68 and step 56, as will be seen best in FIGURE 9. It will be appreciated that this vacuum-formed seal to prevent leakage of unfiltered fat obviates the necessity for any mechanical elements for securing the retainer to the bottom of the bowl to effect a seal.

During the filling operation when the retainer 72, filter element 68 and load bearing element 62 are forced upward by the fluid flow and float in the liquid, the flexible filter 68 is generally distorted and may assume a concave-convex configuration. When these elements return to the bottom of the bowl, it is imperative that the entire marginal edge 70 of filter 68 is secured between the marginal portion 76 of retainer 72 and the step 56. It is important that when these elements are seated, no portion of the filter element 68 extends beyond the outer edge of the horizontal surface 58 of step 56 so as to be turned upward along the wall of bowl 24, since this may adversely affect the seal. Consequently, the diameter of the filter element 68 must be less than the diameter of the bowl 24 which increases the possibility that the marginal edge 70 will not be properly secured.

Thus, the filter element must be maintained substantially flat for a proper seal to be effected along the entire circumferential edge of filter 68. Since the expanded metal screen 80 may be eliminated or must be spaced from the filter element to prevent flow restriction, at least one bar 82 is positioned horizontally across the retainer 72 below the screen 80 to prevent the filter from distorting or warping.

The residual unfiltered fat which is initially trapped below filter element 68 during filling will be pumped through hose 48 and dip tube 52 back into the bowl. After a brief period, this residue will be removed and the motor 28 may be stopped at which time all contaminated fat will be above the filter element 68 in bowl 24. The dip tube 52 may then be placed into the fat container from which the unfiltered fat was removed and the selector positioned to pump filter fat into such container. When all fat is filtered and the bowl is empty the filter element may be discarded, although it may be re-used several times while maintaining a satisfactory quality of purified fat. When all filtering has been completed any residual fat will drain through opening 40 into pipe 36, which due to its incline, will allow the fluid to drain out when petcock 44 is opened. This is important since under many conditions in the field any residual fat will solidify in the pump, pipes, and fitting which is extremely difficult to remove. In the event that the operator fails to drain the apparatus after use and the fat solidifies in the pipe 36, T-fitting 34 and pipe 36, a slightly flexible rod may be inserted through petcock 44 to ream out the passage.

It will be recognized that the manner in which the seal is created in the apparatus is critical in the operation of the unit. Since the bowl is filled through the same opening as the filtered fat is exhausted, the filter element cannot be securely fastened to the bottom of the bowl at the beginning of the operation. This would prevent any practical method of filling through the opening located below the filter element. Nor would it be practical to mechanically secure the filter element to effect a seal after the bowl is filled. However, the present apparatus provides an effective liquid seal at the peripheral edge of the filter paper solely by means of the vacuum created beneath the filter which results in substantial pressure differential across the filter sealing the marginal edge of the filter between the retainer marginal portion and the step. It is also to be noted that the load on the filter element is not supported only by itself in which case it would likely rupture, but it is supported by the bearing screen element.

The apparatus 20 is also constructed so that the upper edge of bowl 24 is relatively low relative to the floor so that it may be used in conjunction with fat fryers having a gravity drain at the bottom which will empty the fat directly into the bowl without requiring the withdrawal thereof by the pump.

The above-described embodiment of a liquid vacuum filter apparatus is but the preferred form of applicant's invention, it being contemplated that applicant be limited only by the appended claims.

We claim:

1. A liquid vacuum filter apparatus comprising:
   (a) a frame supporting a bowl having an opening in the bottom and a peripheral step adjacent the side wall,
   (b) pumping means having at least two ports mounted on said frame, one of said ports in fluid communication with said bowl opening,
   (c) a motor mounted on said frame in operative engagement with said pumping means for driving said pumping means in either direction,
   (d) an electrical switch mounted on said frame for selectively controlling the driving direction of said motor and electrically connected with said motor,
   (e) a flexible fluid conductor connected at one end to the other pumping means port,
   (f) a load-bearing perforate element lying on the bottom of said bowl and loosely fitted within said peripheral step,
   (g) a filter element supported by said load-bearing perforate element and having its marginal edge overlying said peripheral step and loosely fitted therewith, and being loosely fitted within said bowl side wall and spaced inwardly therefrom.
   (h) a retaining element having an imperforate marginal portion overlying said filter element marginal edge loosely fitted within said bowl side wall and spaced inwardly therefrom and supported by said peripheral step so as to form a peripheral seal with said filter element and said step when a vacuum is created beneath said filter element,
   (i) said retaining element, filter element, and load-bearing perforate element being so constructed and arranged so as to move as a unit and being unconstrained to move vertically in said bowl during filling of said bowl.

2. The liquid vacuum filter apparatus of claim 1 wherein said retaining element additionally comprises means for maintaining said filter element substantially flat so that the marginal edge of said filter element overlies the peripheral step when said retaining element rests upon said step.

3. The means for maintaining said filter element substantially flat of claim 2, comprising at least one bar horizontally connected across said retainer imperforate marginal portion, said bar having its lower surface coplanar with the lower surface of said retainer imperforate marginal portion.

References Cited

UNITED STATES PATENTS

| | | | |
|---|---|---|---|
| 377,386 | 2/1888 | Jewell | 210—206 |
| 893,177 | 7/1908 | Long | 210—482 |
| 1,067,935 | 7/1913 | Merkle | 210—482 |
| 2,069,939 | 2/1937 | Browning | 210—477 X |
| 2,477,404 | 7/1949 | Butt | 210—482 X |
| 2,516,102 | 7/1950 | Brant | 210—479 |
| 3,045,827 | 7/1962 | Hough | 210—110 |
| 3,263,818 | 8/1966 | Gedrich | 210—416 |

REUBEN FRIEDMAN, *Primary Examiner.*

J. DE CESARE, *Assistant Examiner.*